(12) United States Patent
Yang et al.

(10) Patent No.: US 11,910,960 B2
(45) Date of Patent: Feb. 27, 2024

(54) FOOD MIXING DEVICE

(71) Applicant: Shenzhen Chenbei Technology Co., Ltd., Shenzhen (CN)

(72) Inventors: Lin Yang, Shenzhen (CN); Hai Yang, Shenzhen (CN)

( * ) Notice: Subject to any disclaimer, the term of this patent is extended or adjusted under 35 U.S.C. 154(b) by 877 days.

(21) Appl. No.: 16/892,230

(22) Filed: Jun. 3, 2020

(65) Prior Publication Data

US 2020/0375401 A1 Dec. 3, 2020

(30) Foreign Application Priority Data

Jun. 3, 2019 (CN) .......................... 201910476867.7

(51) Int. Cl.
| | |
|---|---|
| *A47J 43/07* | (2006.01) |
| *A47J 43/044* | (2006.01) |
| *A47J 43/08* | (2006.01) |
| *G01K 1/024* | (2021.01) |
| *G01K 1/14* | (2021.01) |
| *B01F 35/213* | (2022.01) |
| *B01F 35/21* | (2022.01) |
| *B01F 35/214* | (2022.01) |

(52) U.S. Cl.
CPC .......... *A47J 43/0711* (2013.01); *A47J 43/044* (2013.01); *A47J 43/082* (2013.01); *B01F 35/213* (2022.01); *B01F 35/2115* (2022.01); *B01F 35/2142* (2022.01); *G01K 1/024* (2013.01); *G01K 1/14* (2013.01); *A47J 2043/04427* (2013.01); *A47J 2202/00* (2013.01)

(58) Field of Classification Search
CPC .......... A47J 43/0711; A47J 2043/04427; A47J 2202/00; B01F 35/2115; B01F 35/213
USPC ........................................................ 366/129
See application file for complete search history.

(56) References Cited

U.S. PATENT DOCUMENTS

| | | | | |
|---|---|---|---|---|
| 10,362,905 | B1* | 7/2019 | Gravel ..................... | H04B 5/02 |
| 2015/0216359 | A1* | 8/2015 | Schuette ............... | B01F 35/512 |
| | | | | 241/282.1 |
| 2016/0367072 | A1* | 12/2016 | Boone ................... | A47J 43/046 |
| 2019/0277757 | A1* | 9/2019 | Frielinghaus ......... | G01J 3/0291 |
| 2019/0307287 | A1* | 10/2019 | Magatti ................ | A47J 31/521 |

* cited by examiner

*Primary Examiner* — Marc C Howell

(74) *Attorney, Agent, or Firm* — Tsz Lung Yeung

(57) ABSTRACT

A food mixing device includes a main housing, a food sensing module and a signal control module. The food sensing module is provided in the mixing portion of the main housing for detecting a temperature and predetermined ingredients of food materials mixed by the food mixing device. The signal control module is provided in the receiving cavity of the main housing and electrically connected to the food sensing module. The is arranged to transmit information about detected temperature and detected food ingredients to at least one of a built-in display unit, an external electronic device and an external audio device.

17 Claims, 5 Drawing Sheets

FOOD MIXING DEVICE

CROSS REFERENCE TO RELATED APPLICATION

This is a non-provisional application which claims priority to a Chinese patent application having an application number of CN 201910476867.7, and a filing date of Jun. 3, 2019, the entire contents of which is hereby incorporated by reference.

BACKGROUND

Field of Invention

Embodiments of the present disclosure relates to a food mixing device, and more particularly to a food mixing device comprising a signal control module which is capable of transmitting food temperature or food ingredients information to an external or a built-in display unit, or an electronic device for visual or audio reporting.

Description of Related Arts

Conventional food mixing devices have widely been utilized around the world.

A conventional food mixing device may simply comprise an elongated mixer body for allowing a user to manually stir food mixtures. At times, a user may also want to know the temperature and ingredients of the food mixtures, yet a conventional food mixing device cannot achieve these functions. As a result, a user may need to obtain other devices to measure this essential information.

As a result, there is a need to develop a food mixing device which is capable of measuring food temperature and ingredients and allowing this essential information to be reported through a wide variety of methods.

SUMMARY

Implementations of the present disclosure provide a food mixing device which comprises a signal control module which is capable of transmitting food temperature or food ingredients information to at least one of an external or a built-in display unit, or an external electronic device for visual or audio reporting.

In one aspect of embodiments of the present disclosure, it provides a food mixing device, comprising:
 a main housing a receiving cavity and a mixing portion;
 a food sensing module provided in the mixing portion of the main housing, the food sensing module comprising a temperature sensor supported in the mixing portion of the main housing for detecting a temperature of food materials mixed by the food mixing device, and a food ingredient sensor supported the main housing for detecting predetermined ingredients of food materials mixed by the food mixing device; and
 a signal control module provided in the receiving cavity of the main housing and electrically connected to the food sensing module, the signal control module being arranged to transmit information about detected temperature and detected food ingredients to at least one of an external display unit, an external electronic device and an external audio device.

This summary presented above is provided merely to introduce certain concepts and not to identify any key or essential features of the claimed subject matter.

DETAILED DESCRIPTION OF THE PREFERRED EMBODIMENT

Figure 1:
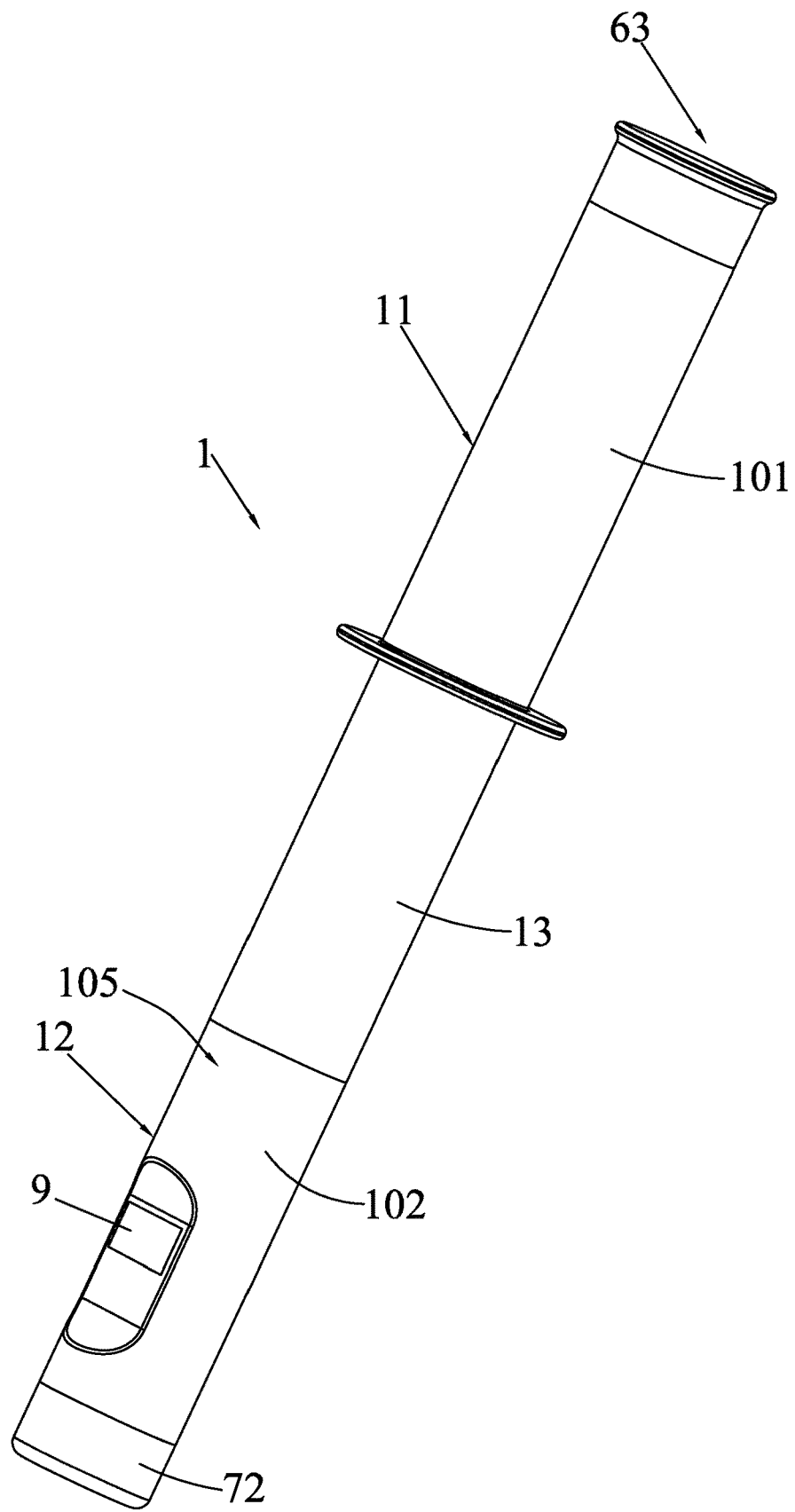
FIG. 1 is a perspective view of a food mixing device according to a preferred embodiment of the present invention.

The following detailed description of the preferred embodiment is the preferred mode of carrying out the present disclosure. The description is not to be taken in any limiting sense. It is presented for the purpose of illustrating the general principles of embodiments of the present disclosure.

It should be appreciated that the terms "install", "connect", "couple", and "mount" in the following description refer to the connecting relationship in the accompanying drawings for easy understanding of embodiments of the present disclosure. For example, the connection can refer to permanent connection or detachable connection. Furthermore, "connected" may also mean direct connection or indirect connection, or connection through other auxiliary components. Therefore, the above terms should not be an actual connection limitation of the elements of embodiments of the present disclosure.

It should be appreciated that the terms "length", "width", "top", "bottom", "front", "rear", "left", "right", "vertical", "horizontal", "upper", "lower", "exterior", and "interior" in the following description refer to the orientation or positioning relationship in the accompanying drawings for easy understanding of embodiments of the present disclosure without limiting the actual location or orientation of embodiments of the present disclosure. Therefore, the above terms should not be an actual location limitation of the elements of embodiments of the present disclosure.

It should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of embodiments of the present disclosure.

Referring to FIG. 1 to FIG. 6 of the drawings, a food mixing device according to one or more embodiments of the present disclosure is illustrated. Broadly, the food mixing device may comprise a main housing 1 having a receiving cavity 10 and a mixing portion 12, a food sensing module 20, and a signal control module 30. The food mixing device may be used for stirring or mixing food mixtures having a wide variety of ingredients.

The food sensing module 20 may be provided in the mixing portion 12 of the main housing 1. The food sensing module 20 may comprise a temperature sensor 5 supported in the mixing portion 12 of the main housing 1 for detecting a temperature of food materials mixed by the food mixing device, and a food ingredient sensor 3 supported by the main housing 1 for detecting predetermined ingredients of food materials mixed by the food mixing device.

The signal control module 30 may be provided in the receiving cavity 10 of the main housing 1 and electrically connected to the food sensing module 20. The signal control module 30 may be arranged to transmit information about detected temperature and detected food ingredients to at least one of an external display unit, an external electronic device and an external audio device for visual or audio reporting of the information about detected food temperature and detected food ingredients.

According to the preferred embodiment of the present disclosure, the main housing 1 may have an elongated structure and may further have a handle portion 11 for allowing a user to grab thereon. The main housing 1 may comprise a handle member 101, a mixing member 102, and an extension member 13 extended between the handle member 101 and the mixing member 102. The handle portion 11 and the mixing portion 12 may be formed at the handle member 101 and the mixing member 102 of the main housing 1 respectively. Thus, a user may manually hold the handle portion 11 and manually utilize the mixing portion 12 to stir the food mixture. The handle member 101 and the mixing member 102 may be securely connected to two opposed ends of the extension member 13 respectively. Alternatively, the handle member 101, the mixing member 102 and the extension member 13 may form an integral one-piece structure.

Figure 3:
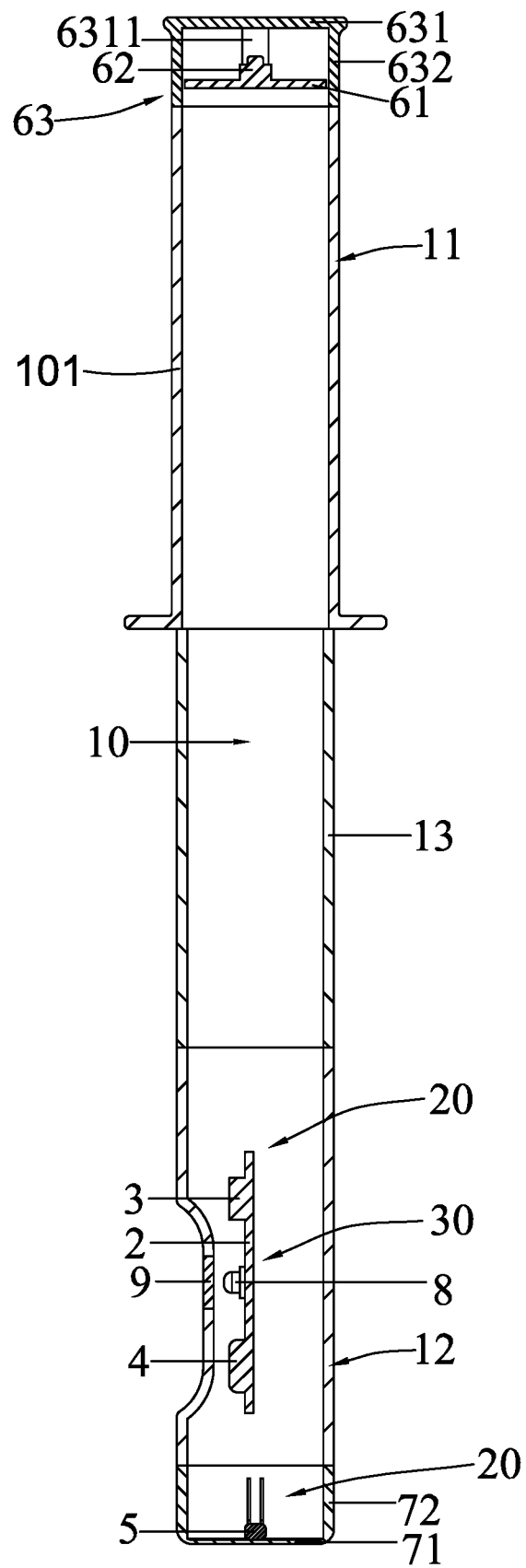
FIG. 3 is sectional front view of the food mixing device according to the preferred embodiment of the present invention.

As shown in FIG. 3 of the drawings, each of the handle member 101, the mixing member 102 and the extension member 13 may be tubular in structure, in which the receiving cavity 10 may extend along the handle member 101, the mixing member 102 and the extension member 13. The main housing 1 may be configured from rigid plastic material. Moreover the connection between the handle member 101 and the extension member 13, and the connection between extension member 13 and the mixing member 102 may be made to be waterproof so as to prevent water or food materials from entering the receiving cavity 10 when the food mixing device is being used or cleaned.

The signal control module 30 may further comprise a control circuitry 31 and a Printed Circuit Board (PCB 2), wherein the control circuitry 31 may be implemented on the PCB 2. The PCB 2 may be supported in the mixing portion 12 of the main housing 1. The control circuitry 31 may serve as a central control unit for centrally controlling and managing all electrical components of the food mixing device of embodiments of the present disclosure.

The food sensing module 20 may be use for sensing or detecting predetermined attributes or parameters or physical properties of the food mixture. For example, the temperature sensor 5 may be provided in the mixing portion 12 of the main housing 1 for measuring the temperature of the food mixture. The temperature sensor 5 may be electrically connected to the PCB 2 and the control circuitry 31 so that the temperature measured by the temperature sensor 5 may be transmitted to the control circuitry 31 for further processing.

Figure 2:
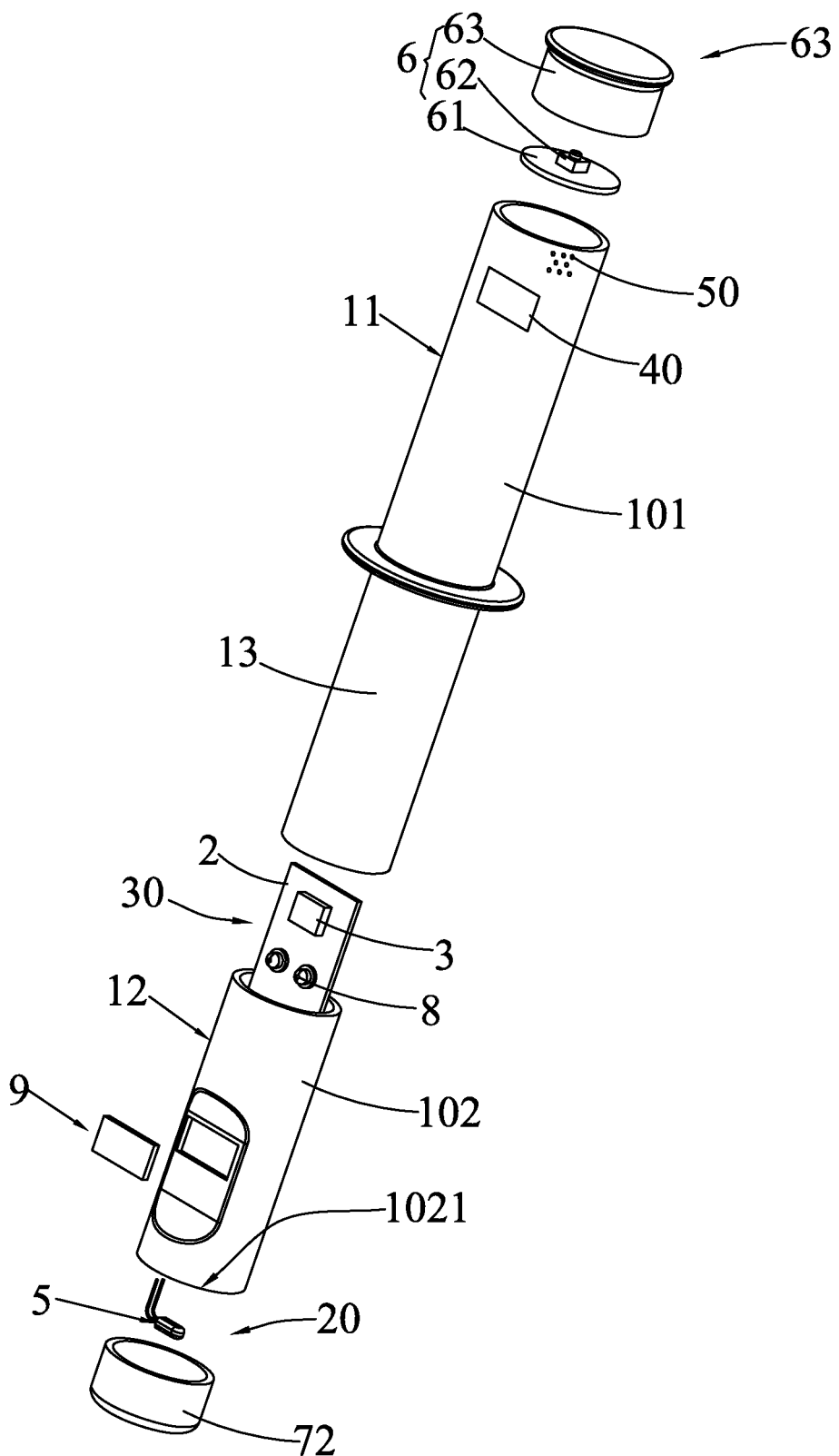
FIG. 2 is an exploded perspective view of the food mixing device according to the preferred embodiment of the present invention.

As shown in FIG. 2 and FIG. 3 of the drawings, the temperature sensor 5 may be positioned at a lower end of the main housing 1 in the mixing portion 12 so that the temperature sensor 5 may be arranged to come into close proximity to the food mixture so as to maximize the accuracy of the corresponding temperature measurement.

More specifically, the main housing 1 may further comprise a bottom tubular member 72 mounted on a lower end 1021 of the mixing member 102, and a bottom cap 71 mounted on the bottom tubular member 72, wherein the receiving cavity 10 may also extend along the bottom tubular member 72. Moreover, the bottom tubular member 72 and the bottom cap 71 may also form part of the mixing portion 12 of the main housing 1, so that the temperature sensor 5 may be mounted on bottom cap 71 within the bottom tubular member 72. This mounting configuration allows the temperature sensor 5 to be in close proximity to the food mixture so as to maximize the accuracy of the temperature measurement. Note that the bottom tubular member 72 may be configured from rigid plastic material, while the bottom cap 71 may be configured from metallic material, such as stainless steel, for effective thermal conduction. The connection between the bottom tubular member 72 and the mixing member 102 may also be made to be waterproof.

The food ingredients sensor 3 may be positioned in the mixing member 102 at the mixing portion 12 for detecting food ingredients of the food mixture. In this preferred embodiment, the food ingredients sensor 3 may be electrically connected to the control circuitry 31 and the PCB 2 so that information about food ingredients as detected by the food ingredients sensor 3 may be electrically transmitted to the control circuitry for further processing. The food ingredients sensor 3 may be configured to detect food ingredients by detecting spectra of food mixture through electromagnetic radiation.

In this preferred embodiment, both the PCB 2 and the food ingredients sensor 3 may be positioned in the mixing member 102 at the mixing portion 12 so that the food ingredients sensor 3 may be easily and conveniently implemented on the PCB 2. Alternatively, the PCB 2 may be also mounted on other portions of the main housing 1.

The signal control module 30 may further comprise a communication module 4 implemented on the PCB 2 and electrically connected to the control circuitry 31, wherein the communication module 4 may be arranged to wirelessly transmit the information about detected food temperature and/or detected food ingredients to an external electronic device, such as a smartphone or a tablet computer. A user may be able to install a predetermined software on the external electronic device for obtaining such information about detected food temperature and/or detected food ingredients. This information may be visually observed through a display, or delivered as audible sound by a speaker of the external electronic device.

In this preferred embodiment, the communication module 4 may be configured to wirelessly transmit information about detected food temperature and/or detected food ingredients through predetermined wireless networking protocols, such as through WIFI. Thus, the food mixing device may be connected to an external WIFI network through the communication module 4.

The communication module 4 may also be configured to wirelessly transmit information about detected food temperature and/or detected food ingredients through predetermined short-distance radio waves, such as BLUETOOTH protocols. Thus, the food mixing device may be connected to an external electronic device through BLUETOOTH protocols.

The food mixing device may further comprise a display unit 40 provided on the main housing 1 and electrically connected to the signal control module 30 for display information about detected food temperature and/or detected food ingredients. Thus, the display unit 40 may be a built-in display for visually reporting the information about detected food temperature and/or detected food ingredients.

Moreover, the food mixing device may further comprise a speaker 50 provided on the main housing 1 and electrically connected to the signal control module 30 for delivering information about detected food temperature and/or detected food ingredients in audible sound. Thus, the speaker 50 may be a built-in speaker for audially reporting the information about detected food temperature and/or detected food ingredients.

Figure 4:
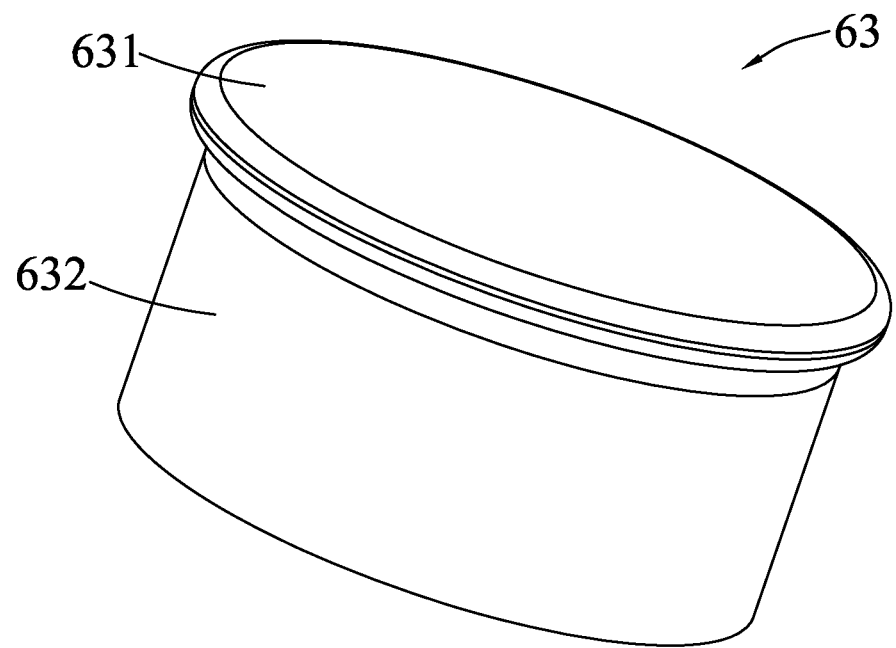
FIG. 4 is a perspective view of the actuator of the food mixing device according to the preferred embodiment of the present invention.
Figure 5:
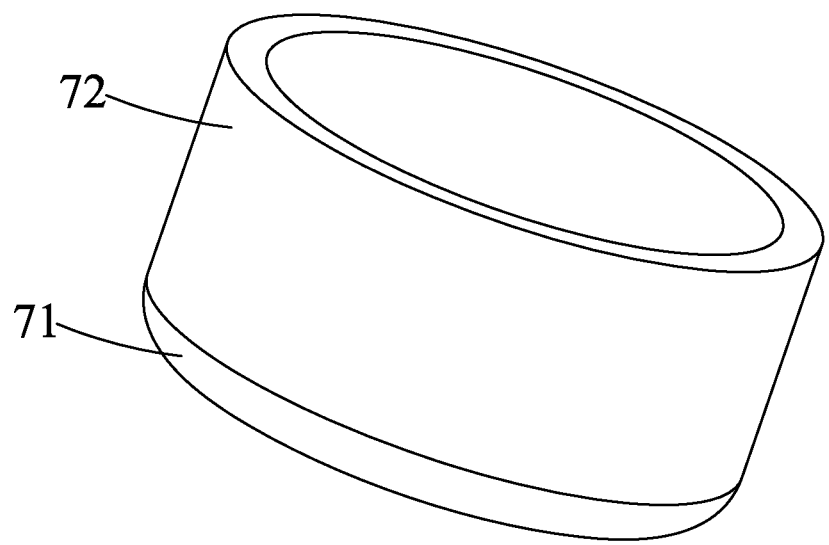
FIG. 5 is a perspective view of a bottom tubular member of the food mixing device according to the preferred embodiment of the present invention.
Figure 6:
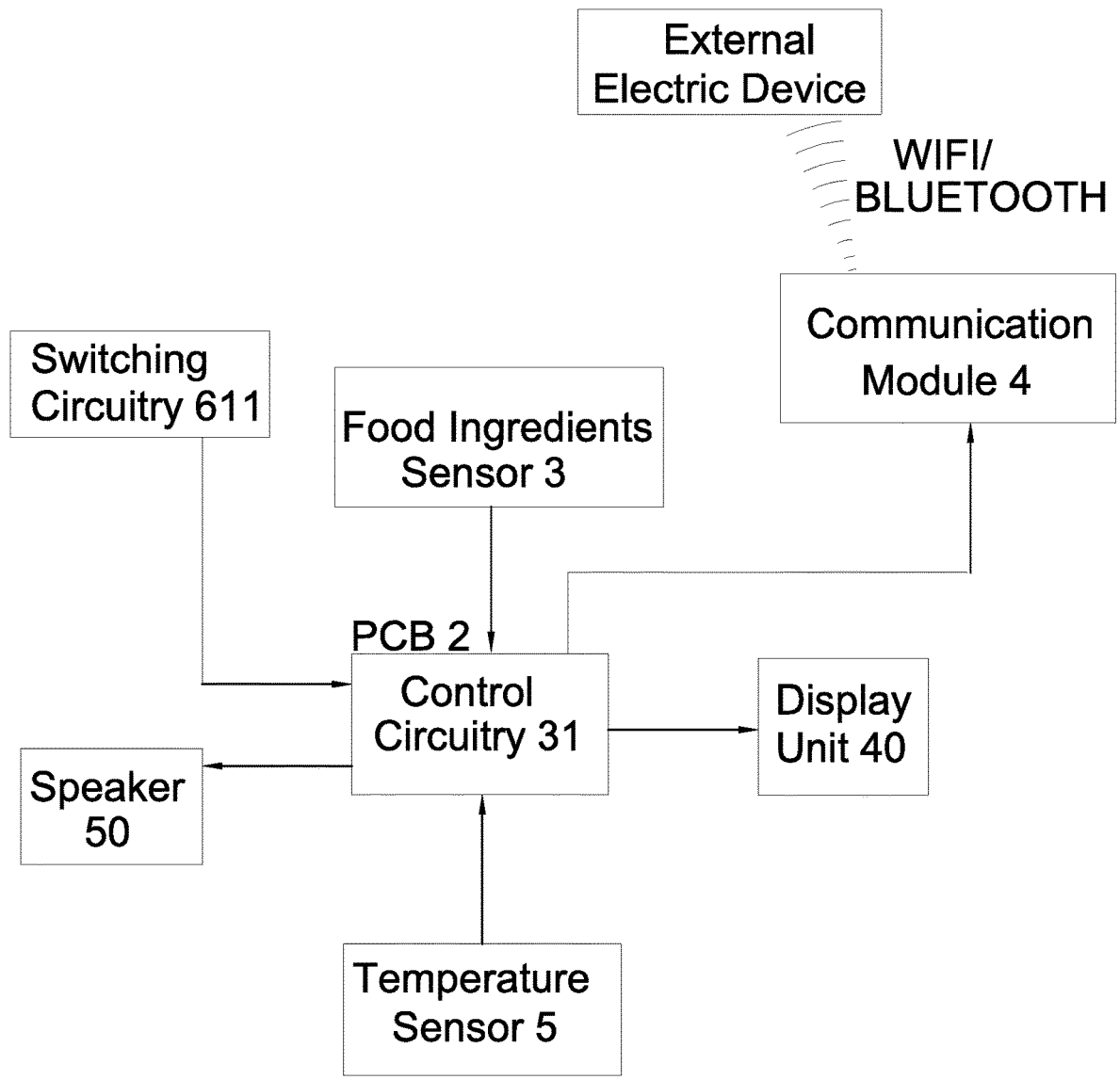
FIG. 6 is a block diagram illustrating electrical connections of the food mixing device according to the preferred embodiment of the present invention.

Referring to FIG. 3 and FIG. 4 of the drawings, the main housing 1 may further comprise a control switch 6 coupled to the handle member 101 for selectively controlling an operation of the food sensing module 20 and the signal control module 30. Specifically, the control switch 6 may comprise a switching PCB 61 received in the receiving cavity 10, a switching circuitry 611 implemented on the switching PCB 61 and electrically connected to the control circuitry 31, a control button 62 coupled to the control PCB 61, and an actuator 63 operatively mounted on the handle member 101 of the main housing 1 and the control button 62. As shown in FIG. 3 of the drawings, the actuator 63 may form a tubular structure in which the switching PCB 61 and the control button 62 may be received in the actuator 63. Accordingly, the receiving cavity 10 of the main housing 1 may therefore extend along the actuator 63.

The actuator 63 may be movably coupled to the handle member 101 such that a when the actuator 63 is depressed, the actuator 63 is arranged to drive the control button 62 to depress as well and the depression of the control button 62 may activate the switching circuitry 611 for selectively activating operation of the food sensing module 20.

The actuator 63 may comprise an actuating tubular member 632 mounted on the handle member 101, and an actuator cap 631 mounted on a top end of the actuating tubular member 632, wherein the PCB 61 may be supported in the actuating tubular member 632 through a connecting member 6311, such as a screw. The connecting member 6311 may be coupled or bias against the control button 62. The connection between the actuating tubular member 632 and a top end 1011 of the handle member 101 may be configured to be waterproof.

In this preferred embodiment, the actuator cap 631 may be configured from soft plastic or rubber material so that a user may be able to slightly depress the actuator cap 631 so as to depress the control button 62 through the connecting member 6311. On the other hand, the actuating tubular member 632 may be configured from relatively harder plastic material for protecting the PCB 61 and the control button 62 received therein.

The food mixing device may further comprise at least one illuminator 8 supported by the main housing 1 and electrically connected to the control circuitry 31 for generating visual signal under predetermined circumstances. The detected food temperature or the temperature range where the detected food temperature is located can be indicated by different attributes of illuminator 8 to remind the user. Among them, the different attributes of the illuminator 8 may comprise the color of the light, the flashing frequency, lighting time, and so on. For example, a flashing signal may be generated to alert a user when the detected food temperature is above a predetermined threshold. The illuminator 8 may be mounted in the receiving cavity 10 behind a cover 9 mounted on an external wall 105 of the main housing 1. The food mixing device may comprise a plurality of illuminators 8 supported by the main housing 1 and electrically connected to the control circuitry 31 for generating different operational or alert signals. The illuminators 8 may be centrally controlled by the control circuitry 31 so as to generate different combinations of alter signals. For example, when the detected food temperature is below a predetermined threshold, one of the illuminators 8 may illuminate. When the detected food temperature is within a predetermined temperature range, another one of the illuminators 8 may illuminate. Finally, when the detected food temperature is above a predetermined threshold, yet another one of the illuminators 8 may illuminate. Other examples of lighting patterns may also be employed.

Embodiments of the present disclosure, while illustrated and described in terms of a preferred embodiment and several alternatives, is not limited to the particular description contained in this specification. Additional alternative or equivalent components could also be used to practice embodiments of the present disclosure.

What is claimed is:

1. A food mixing device, comprising:
a main housing having an elongated structure and a receiving cavity, a mixing portion, and a handle portion, and comprising a handle member, a mixing member, and an extension member extending between said handle member and said mixing member, said handle portion and said mixing portion being formed at said handle member and said mixing member respectively, said handle member and said mixing member connecting to two opposed ends of said extension member respectively, said main housing further comprises a bottom tubular member mounted on a lower end of said mixing member, and a bottom cap mounted on said bottom tubular member, wherein said receiving cavity extending along said bottom tubular member, said bottom tubular member and said bottom cap forming part of said mixing portion of said main housing;
a food sensing module provided in said mixing portion of said main housing, said food sensing module comprising a temperature sensor supported in said mixing portion of said main housing for detecting a temperature of food materials mixed by said food mixing device, and a food ingredient sensor supported in said main housing for detecting predetermined ingredients of food materials mixed by said food mixing device, said temperature sensor being mounted on said bottom cap within said bottom tubular member; and
a signal control module provided in said receiving cavity of said main housing and electrically connected to said food sensing module, said signal control module being arranged to transmit information about at least one of said detected food temperature and said detected food ingredients to at least one of an external electronic device and an external audio device.

2. The food mixing device, as recited in claim 1, wherein said signal control module further comprises a control circuitry and a printed circuit board, wherein said control circuitry is implemented on said printed circuit board, and is arranged to centrally control said food sensing module.

3. The food mixing device, as recited in claim 2, wherein said signal control module further comprises a communication module implemented on said printed circuit board and electrically connected to said control circuitry, wherein said communication module being arranged to wirelessly transmit information about at least one of said detected food temperature and said detected food ingredients to at least one of said external electronic device and said external audio device.

4. The food mixing device, as recited in claim 3, wherein said communication module is configured to wirelessly transmit information about at least one of said detected food temperature and detected food ingredients through a predetermined wireless networking protocol.

5. The food mixing device, as recited in claim 3, wherein said communication module is configured to wirelessly transmit information about at least one of said detected food temperature and detected food ingredients through predetermined short-distance radio waves.

6. The food mixing device, as recited in claim 3, wherein said main housing further comprises a control switch which comprises a switching printed circuit board received in said receiving cavity, a switching circuitry implemented on said switching printed circuit board and electrically connected to said control circuitry, a control button coupled to said control printed circuit board, and an actuator operatively mounted on said handle member of said main housing to selectively actuate said control button, in such a manner that when said actuator is depressed, said actuator is arranged to drive said control button to depress so as to activate said switching circuitry for selectively activating an operation of said food sensing module.

7. The food mixing device, as recited in claim 1, further comprising a display unit provided on said main housing and electrically connected to said signal control module for displaying information about at least one of said detected food temperature and said detected food ingredients.

8. The food mixing device, as recited in claim 3, further comprising a display unit provided on said main housing and electrically connected to said signal control module for displaying information about at least one of said detected food temperature and said detected food ingredients.

9. The food mixing device, as recited in claim 6, further comprising a display unit provided on said main housing and electrically connected to said signal control module for displaying information about at least one of said detected food temperature and said detected food ingredients.

10. The food mixing device, as recited in claim 1, further comprising a speaker provided on said main housing and electrically connected to said signal control module for delivering information about at least one of said detected food temperature and said detected food ingredients in audible sound.

11. The food mixing device, as recited in claim 3, further comprising a speaker provided on said main housing and electrically connected to said signal control module for delivering information about at least one of said detected food temperature and said detected food ingredients in audible sound.

12. The food mixing device, as recited in claim 6, further comprising a speaker provided on said main housing and electrically connected to said signal control module for delivering information about at least one of said detected food temperature and said detected food ingredients in audible sound.

13. The food mixing device, as recited in claim 9, further comprising a speaker provided on said main housing and electrically connected to said signal control module for delivering information about at least one of said detected food temperature and said detected food ingredients in audible sound.

14. The food mixing device, as recited in claim 2, further comprising an illuminator supported by said main housing and electrically connected to said control circuitry for generating visual signal.

15. The food mixing device, as recited in claim 3, further comprising an illuminator supported by said main housing and electrically connected to said control circuitry for generating visual signal.

16. The food mixing device, as recited in claim 6, further comprising an illuminator supported by said main housing and electrically connected to said control circuitry for generating visual signal.

17. The food mixing device, as recited in claim 9, further comprising an illuminator supported by said main housing and electrically connected to said control circuitry for generating visual signal.

* * * * *